US010996537B2

(12) United States Patent
Davies et al.

(10) Patent No.: US 10,996,537 B2
(45) Date of Patent: May 4, 2021

(54) BIASING METHOD FOR INP MACH-ZEHNDER MODULATORS DIRECTLY COUPLED TO RF DRIVER CIRCUITS

(71) Applicant: Lumentum Technology UK Limited, Towcester (GB)

(72) Inventors: Samuel Davies, Towcester (GB); Andrew John Ward, Towcester (GB)

(73) Assignee: Lumentum Technology UK Limited, Northamptonshire (GB)

( * ) Notice: Subject to any disclaimer, the term of this patent is extended or adjusted under 35 U.S.C. 154(b) by 0 days.

(21) Appl. No.: 16/713,898

(22) Filed: Dec. 13, 2019

(65) Prior Publication Data

US 2020/0201135 A1 Jun. 25, 2020

(30) Foreign Application Priority Data

Dec. 21, 2018 (GB) ..................................... 1821128

(51) Int. Cl.
*G02F 1/035* (2006.01)
*G02F 1/225* (2006.01)
(Continued)

(52) U.S. Cl.
CPC .......... *G02F 1/2255* (2013.01); *G02F 1/0123* (2013.01); *G02F 2001/212* (2013.01)

(58) Field of Classification Search
CPC .............. G02F 1/2255; G02F 1/0123; G02F 2001/212; G02F 1/025; H04B 10/501; H04B 10/516; H04B 10/50575
See application file for complete search history.

(56) References Cited

U.S. PATENT DOCUMENTS 8,948,608 B1 2/2015 Pobanz
2016/0054639 A1* 2/2016 Kono ...................... G02F 1/025
385/2
(Continued)

FOREIGN PATENT DOCUMENTS

EP 2615490 A1 7/2013
JP 2018180255 A 11/2018

OTHER PUBLICATIONS

Hettrich et al., "Design Considerations for a 11.3 Gbit/s SiGe Bipolar Driver Array With a 5x6 Vpp Chip-to-Chip Bondwire Output to an MZM PIC", IEEE Journal of Solid-State Circuits, vol. 51, No. 9, Sep. 2016, pp. 2006-2014.
(Continued)

*Primary Examiner* — Ellen E Kim
(74) *Attorney, Agent, or Firm* — Harrity & Harrity, LLP

(57) ABSTRACT

An optical transmitter comprises a directly coupled MZ interferometer and driver circuit. The MZ interferometer comprises a pair of differentially driven MZ electrodes configured to impart RF signals to light travelling through respective arms of the interferometer, and to receive DC bias as a positive voltage via lower n-type cladding of the MZ interferometer. The lower n-type cladding is at a different positive DC potential to an upper plane RF ground of the MZ interferometer, but the lower n-type cladding and the upper plane RF ground have similar AC potential. The MZ interferometer also comprises a pair of resistors in series configured to provide differential RF termination of the MZ electrodes; and a capacitive coupling between a virtual ground formed at a centre point between the pair of resistors and an RF ground configured to provide common-mode RF termination. The DC supply for the driver circuit is applied to the centre point of the RF termination.

20 Claims, 8 Drawing Sheets

(51) Int. Cl.
*G02F 1/01* (2006.01)
*G02F 1/21* (2006.01)

(56) References Cited

U.S. PATENT DOCUMENTS

2017/0163000 A1\* 6/2017 Evans ................. H04B 10/572
2018/0164654 A1\* 6/2018 Ogiso .................... G02F 1/025

OTHER PUBLICATIONS

Search report corresponding to GB1821128.4 dated Jun. 18, 2019, 3 pages.

\* cited by examiner

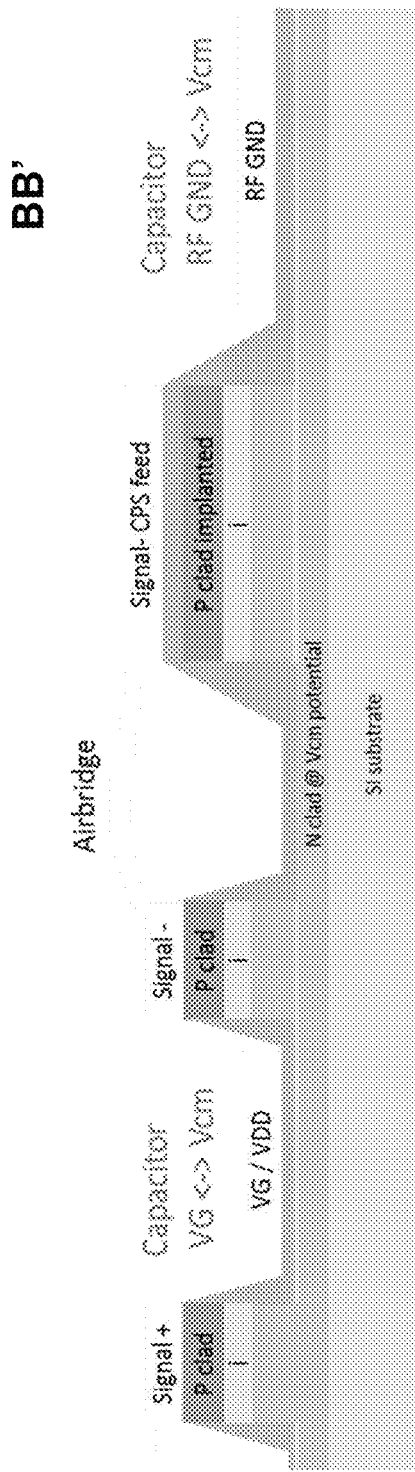
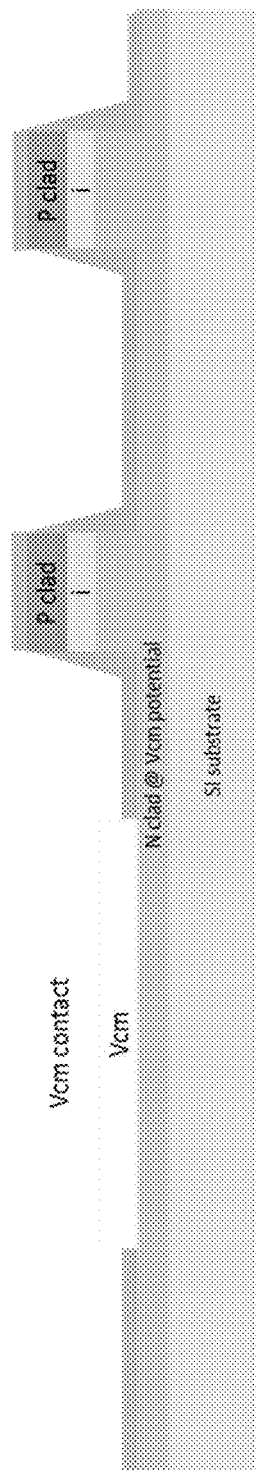
Figure 7A
Figure 7B

BIASING METHOD FOR INP MACH-ZEHNDER MODULATORS DIRECTLY COUPLED TO RF DRIVER CIRCUITS

CROSS REFERENCE TO RELATED APPLICATION

This application claims priority to United Kingdom Patent Application No. 1821128.4, filed on Dec. 21, 2018, entitled "BIASING METHOD FOR INP MACH-ZEHNDER MODULATORS DIRECTLY COUPLED TO RF DRIVER CIRCUITS" which is incorporated by reference herein.

TECHNICAL FIELD

The invention relates to an optical transmitter comprising a directly-coupled MZ modulator interferometer and driver circuit. In particular, the MZ interferometer and driver circuit may be coupled with no RF component train between them.

BACKGROUND

Radio frequency (RF) amplifier chips are often an important component in optical transmitters using Mach-Zehnder (MZ) modulators. Data modulated analogue signals output by a digital signal processor (DSP) of the transmitter will typically be limited to less than 1 volt (V) peak-to-peak amplitude. However, the V2π characteristic of a typical MZ modulator, for example an Indium-phosphide (InP) based MZ modulator, will typically be around 3V (the V2π characteristic referring to the voltage required to drive the modulator over a voltage range equal to twice its half-wave voltage, for example from −Vπ to +Vπ, wherein the half-wave voltage is the voltage required to cause a phase shift of π, or a shift from full transmission to maximum extinction).

Without amplification, the signals output by the DSP are therefore too small in amplitude, resulting in MZ underdrive and sizable modulation losses. The purpose of the RF amplifier, or driver, circuit (driver chip) is to amplify the DSP signals to anamplitude that is compatible with the MZ modulator's V2π specification, therefore minimising the modulation induced loss.

FIG. 1 illustrates a traditional biasing method in an optical transmitter 10 comprising an MZ interferometer 20 and an AC coupled driver or amplifier circuit 30. It will be appreciated that the transmitter 10 may contain more than one MZ interferometer 20, e.g. four MZ interferometers in a nested configuration, but in this illustrative example, only one MZ interferometer 20 is shown. A configuration of interferometers will comprise a modulator chip.

The driver circuit 30 DC supply $V_{DD}$ for the transmitter 10 is applied at the driver circuit 30 output through a bias tee arrangement 40. The bias tee 40 also provides the AC coupling of the driver circuit 30 output to the MZ interferometer 20 through the RF component train 50. The RF termination (differential and common-mode) is provided off-chip as is the negative MZ DC bias $V_{cm}$. The lower n-cladding of the interferometer 20 is strongly coupled to RF ground 70, both directly through the overall ground plane of the optical sub-assembly and capacitively (~100 pF) on-chip.

In the known arrangement of FIG. 1, the driver circuit (driver chip) 30 is therefore located remotely from the MZ interferometer 20, on a printed circuit board (PCB) outside the optical sub-assembly. This remote, "off-chip" location is advantageous in several ways.

Off-chip location enables the use of the bias-tee circuit 40 (used to insert DC power into an AC signal) between the driver circuit 30 and the MZ interferometer 20. The driver circuit 30 outputs are AC coupled (via a capacitive connection) to the RF signal input pads of the MZ interferometer 20. AC coupling allows DC supply $V_{DD}$ of the driver circuit 30 to be applied to the collector output of the driver circuit 30 though the bias tee arrangement, which allows negative DC bias to be applied to the p-side of the interferometer.

The off-chip location of the driver circuit 30 also permits a differential MZ DC bias $V_{cm}$ to be applied as a negative voltage to the MZ modulation electrodes 21, 22, typically at the RF termination end 60.

However, the remote location of the driver circuit 30 from the MZ interferometer 20 results in a relatively long RF component train 50, which is also required to pass through the wall of the MZ interferometer 20 optical sub-assembly. This can compromise the concatenated bandwidth performance of the RF component train 50 due to large RF losses and distortion. It would desirable to provide an arrangement which obviates these issues.

SUMMARY

In one aspect of the present invention there is provided an optical transmitter comprising an MZ interferometer and a driver circuit, wherein said MZ interferometer and driver circuit are directly coupled. The MZ interferometer comprises a pair of differentially driven MZ electrodes configured to impart RF signals to light travelling through respective arms of the interferometer, and to receive DC bias as a positive voltage via lower n-type cladding of the MZ interferometer. The lower n-type cladding is at a different positive DC potential to an upper plane RF ground of the MZ interferometer, but the lower n-type cladding and the upper plane RF ground have similar AC potential. The MZ interferometer further comprises a pair of resistors in series configured to provide differential RF termination of the MZ electrodes; and a capacitive coupling between a virtual ground formed at a centre point between the pair of resistors and an RF ground configured to provide common-mode RF termination. A DC supply for the driver circuit is applied to the centre point of the RF termination.

Capacitive coupling between the lower n-type cladding and the upper plane RF ground may be provided by an on-chip capacitive device and an off-chip capacitive device. The on-chip capacitive device may have a capacitance of about 50 pf, and/or the off-chip capacitive device may have a capacitance of about 100 nF Common-mode RF termination may be provided by a capacitive device having a capacitance of about 10 pF.

The DC bias may be provided to both the lower n-type cladding and a peripheral p-type cladding of the MZ interferometer. A lower n-type cladding contact may be provided on an upper face of the MZ interferometer. A lower n-type cladding contact may be provided on a back face of the MZ interferometer.

The MZ interferometer and the driver circuit may be co-located within an optical sub-assembly of the transmitter, with no bias tee arrangement or RF component train between the MZ interferometer and the driver circuit.

The optical transmitter may comprise a plurality of MZ interferometers comprising a modulator chip.

In another aspect of the present invention there is provided a method of biasing an optical transmitter comprising a directly-coupled MZ interferometer and a driver circuit. The method comprises applying positive voltage DC bias to a pair of differentially driven MZ electrodes of the MZ interferometer via lower n-type cladding of the MZ interferometer, wherein the lower n-type cladding is at a different positive DC potential to an upper plane RF ground of the MZ interferometer, but wherein the lower n-type cladding and the upper plane RF ground have similar AC potential. The method further comprises providing differential RF termination of the MZ electrodes via a pair of resistors in series; providing common-mode RF termination via a capacitive coupling between a virtual ground formed at a centre point between the pair of resistors and RF ground; and applying driver circuit DC supply at the centre point of the RF termination. The method may comprise providing capacitive coupling between the lower n-type cladding and the upper plane RF ground by an on-chip capacitive device and an off-chip capacitive device. The on-chip capacitive device may have a capacitance of about 50 pf, and/or the off-chip capacitive device has a capacitance of about 100 nF The method may comprise providing common-mode RF termination by a capacitive device having a capacitance of about 10 pF.

The method may comprise providing DC bias to both the lower n-type cladding and a peripheral p-type cladding of the MZ interferometer. A lower n-type cladding contact may be provided on an upper face of the MZ interferometer. A lower n-type cladding contact may be provided on a back face of the MZ interferometer.

The method may comprise co-locating the MZ interferometer and the driver circuit within an optical sub-assembly of the transmitter, with no bias tee arrangement or RF component train between the MZ interferometer and the driver circuit.

BRIEF DESCRIPTION OF THE DRAWINGS

FIG. 7A is a cross sectional view through line BB' of FIG. 6;

FIG. 7B is a cross sectional view through line CC' of FIG. 6; and

DETAILED DESCRIPTION

An optical transmitter comprising an MZ interferometer and a driver circuit, where the MZ interferometer and driver circuit are directly coupled, is described herein with reference to FIGS. 2 to 8. A method of biasing an optical transmitter comprising a directly-coupled MZ interferometer and driver circuit is also described. For convenience, the following discussion refers to a MZ interferometer and driver circuit (driver chip), but it will be appreciated that these need not be separate entities and may be co-located.

The inventors have realised that the concatenated bandwidth performance of an MZ modulator can be significantly improved by co-locating the RF driver circuit with the MZ interferometer(s), within the optical sub-assembly. In this arrangement, the driver circuit and MZ interferometer are directly coupled, rather than being AC coupled. Co-location shortens the length of the RF component train and reduces RF losses and distortion. The absence of a bias tee arrangement also reduces the package size.

However, this co-located arrangement requires significant modifications to the biasing arrangement of the MZ interferometer.

For example, the driver circuit DC supply $V_{DD}$ can no longer be applied at the driver output owing to the absence of a bias tee arrangement. Instead, the driver device (chip) DC supply $V_{DD}$ must be applied to the termination end of the MZ modulation arm. As a result, the negative MZ DC bias $V_{cm}$ cannot be applied at the termination end of the MZ modulation arm and must instead be provided as an opposite positive voltage $+V_{cm}$ to the lower n-type cladding side of the MZ interferometer device.

The RF feed lines or waveguides that connect the RF signal input pads to the modulation electrodes are of a coplanar waveguide (CPW) type and/or a coplanar stripline (CPS) type. The RF signal electric field exists in a horizontal plane between a central signal track and peripheral ground tracks, or balanced differential signal tracks, respectively. However, in order to modulate the optical waveguide phase, the RF signal electric field must exist in a vertical plane between the modulation electrodes and the underlying n-type lower cladding, with the electric field passing through the optical core. The RF signal electric field must therefore transition smoothly from the horizontal plane to the vertical plane. There must be sufficient high speed coupling between RF ground on the upper plane and the RF ground in the n-type lower cladding to enable this.

Figure 1:
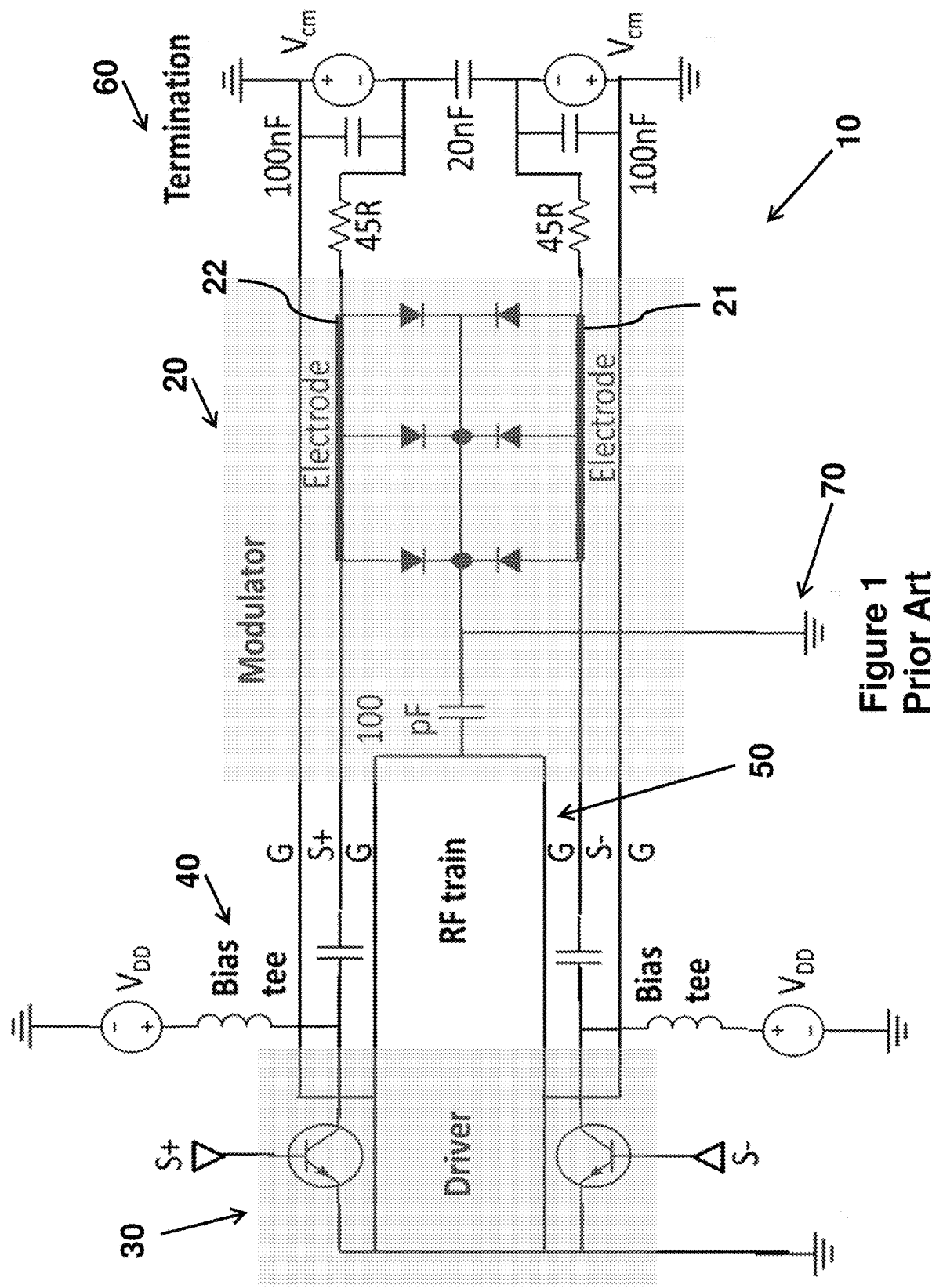
FIG. 1 is a schematic diagram illustrating traditional biasing in an optical transmitter comprising an MZ interferometer and an AC coupled driver circuit.

In the known arrangement illustrated by FIG. 1, with an AC coupled driver circuit in an off-chip location, the upper plane RF ground and n-type lower cladding RF ground are directly coupled, i.e. they are both at the same DC and AC potential.

However, as discussed above, in the arrangement wherein the driver circuit and MZ interferometer(s) are co-located and directly coupled, the lower n-type cladding must be DC biased using a positive voltage $+V_{cm}$ relative to the RF ground on the upper plane. This arrangement requires capacitive coupling between the lower n-type cladding and the RF ground on the upper plane, such that they are at similar AC, but different DC, potentials. In other words, the lower n-type cladding must be at a different positive DC potential to the upper plane RF ground, but the n-type cladding and the upper plane RF ground must be AC coupled, or have similar AC potential to ensure successful delivery of the RF signals onto the MZ electrodes. Coupling between the upper plane RF ground, $V_{cm}$ and driver circuit DC supply $V_{DD}$ must be at the same RF potential.

As will be described below, this capacitive coupling is provided both on and off-chip at low and high capacitance respectively, therefore enabling AC coupling over a wide frequency range.

Figure 2:
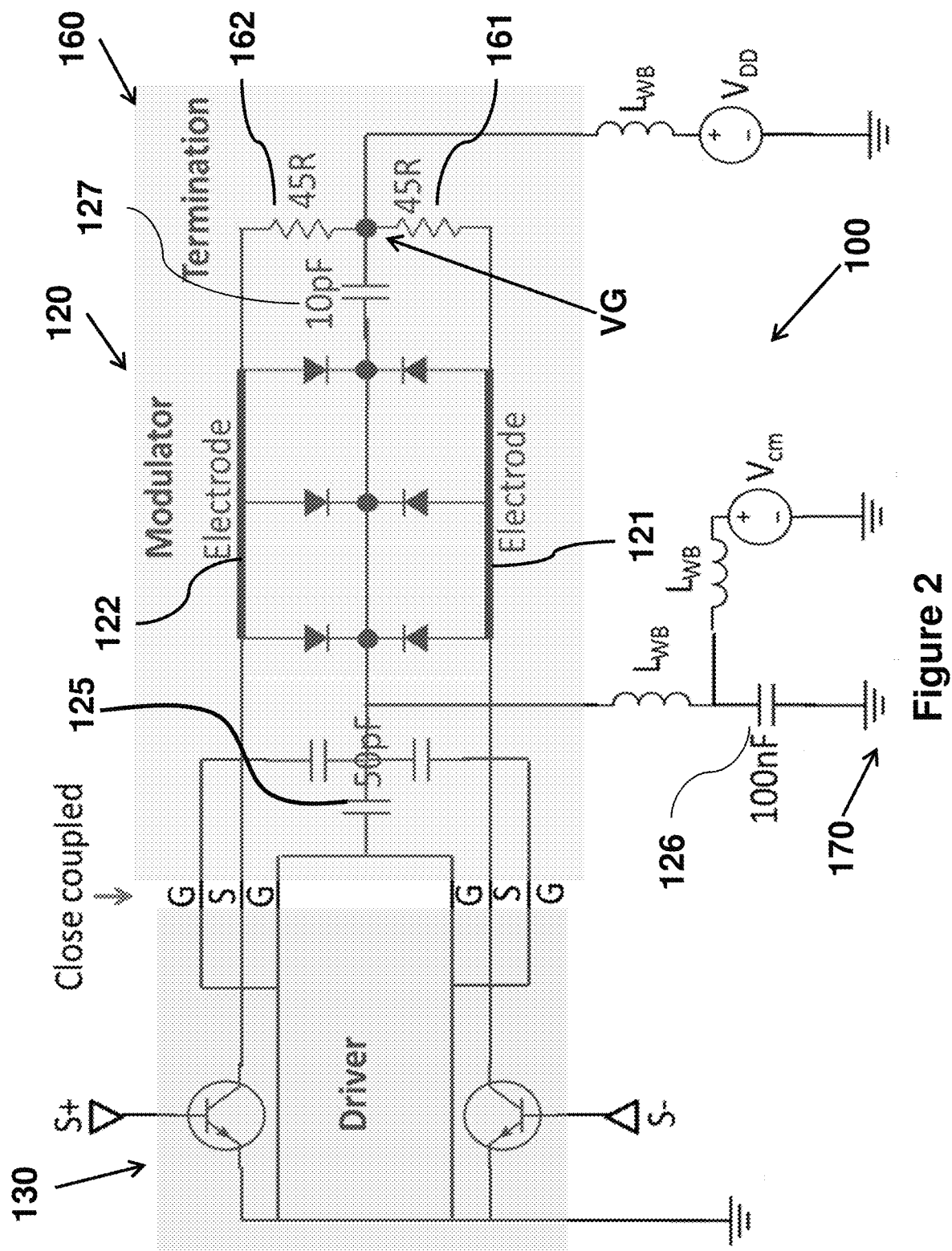
FIG. 2 is a schematic diagram illustrating biasing in an optical transmitter comprising directly coupled MZ interferometer and driver circuit.

FIG. 2 illustrates an optical transmitter 100 in which an MZ interferometer 120 and driver circuit 130 (driver chip) are co-located and directly coupled. As previously discussed, a configuration of interferometers comprises a modulator chip, and as described herein, the driver circuit and modulator chip will be directly coupled. The driver circuit 130 is close-coupled (i.e. directly coupled) with no bias tee arrangement present. Additionally, there is no RF component train between the driver circuit 130 and MZ 120 interferometer apart from short wirebonds with a low inductance.

In contrast to the traditional biasing arrangement illustrated in FIG. 1, in the exemplary transmitter 100 of FIG. 2 the RF termination 160 between the differentially driven MZ electrodes is provided on-chip. Differential termination is provided as two resistors 161, 162 in series. In this example each resistor is approximately 50 Ohms, providing a total of 100 Ohm differential termination impedance. Alternatively, each resistor may provide between approximately 25 to 50 Ohms, in combination providing a total of approximately 50 to 100 Ohms. The virtual ground (VG) formed at the centre point of the two resistors 161, 162 must be capacitively coupled to RF ground 170 to provide common-mode termination, ensuring that any common-mode excitation of the MZ electrodes 121, 122 is also terminated. Therefore, in this example both differential and common-mode RF termination is provided on—rather than off-chip. Alternatively or additionally, the resistors may be provided off-chip, although on-chip resistors provide a significant improvement in simplicity in packaging in relationship to a directly coupled driver circuit.

Optimal termination geometry, which aims to provide purely resistive impedance, tends to minimize parasitic capacitance and inductance of the resistors 161, 162. Therefore, the resistors 161, 162 are kept short by use of highly resistive tracks and by being laid over an isolating stack of implanted p-cladding plus intrinsic InP above the RF grounded n-cladding. Optimal resistor geometries will be further discussed below, with reference to FIG. 8.

In this example, the driver circuit DC supply $V_{DD}$ is applied to the centre point of the on-chip RF termination 160 via an inductive wirebond connection $L_{WB}$. Typically, a 25 µm diameter gold wirebond will have an inductance of approximately 0.1 nH/mm. As previously discussed, the MZ negative DC bias $V_{cm}$ cannot therefore be applied at this location and is instead applied as an opposite, positive voltage $+V_{cm}$ to the lower n-type cladding, which must be capacitively coupled only to the upper plane RF ground to ensure delivery of signals from the RF feed lines to the MZ electrodes 121, 122. This capacitive coupling is provided by capacitors 125, 126 on- and off-chip (in this example of approximately 50 pF and 100 nF respectively), enabling AC coupling over a wide frequency range. Common-mode termination is provided by a 10 pF capacitor 127 to $V_{cm}$, which in turn couples to RF ground 170.

Figure 3:
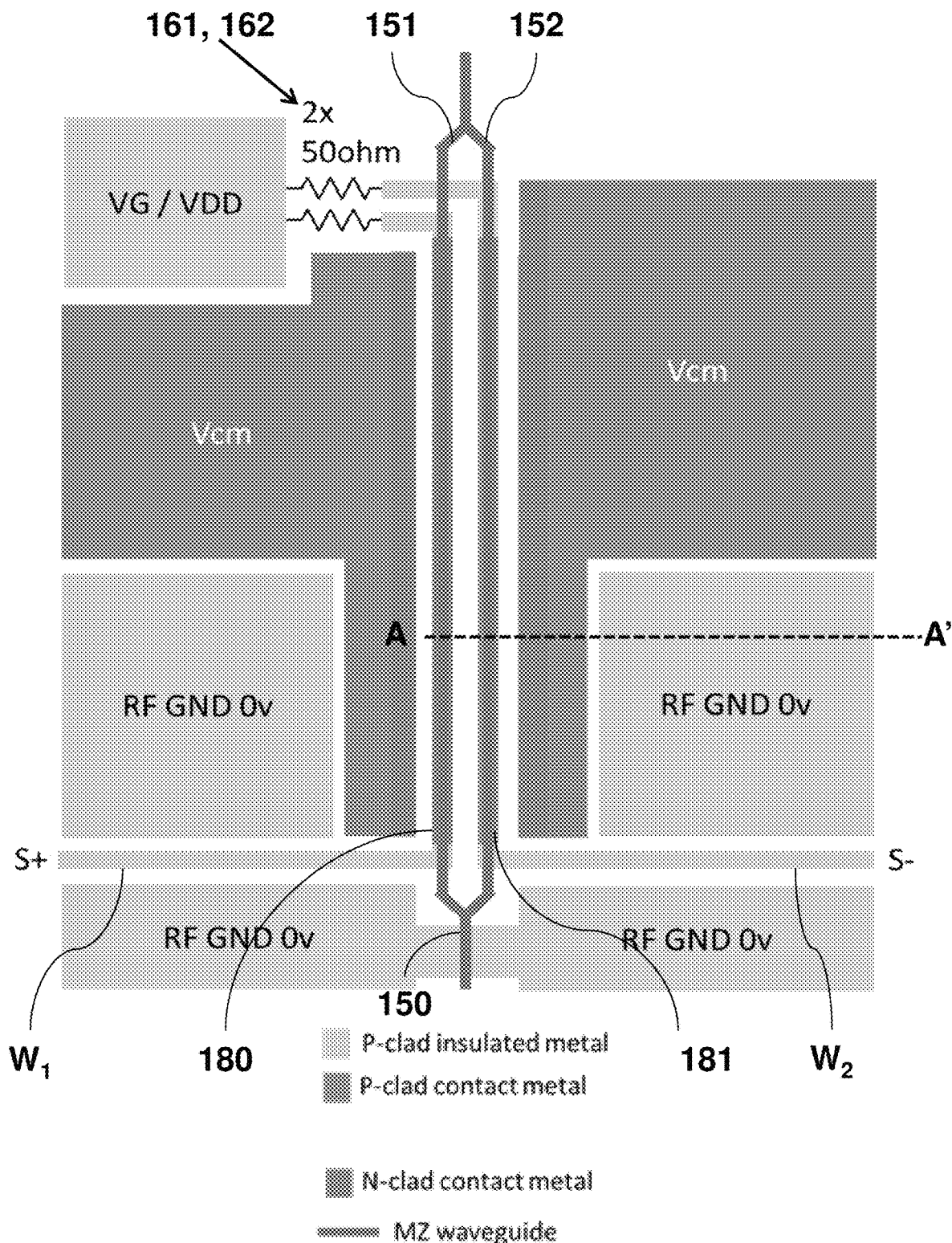
FIG. 3 illustrates a biasing and capacitive coupling scheme for use in the transmitter of FIG. 2, wherein the electrodes are of microstrip type.

FIG. 3 illustrates a biasing and capacitive coupling scheme for use in the optical transmitter of FIG. 2 in which an optical waveguide 150 splits into two branches 151, 152. In this illustrated example, the MZ electrodes 180, 181 of the optical transmitter are of microstrip type. Differential signals S+ and S− are delivered to the MZ electrodes through GSG CPW RF waveguides $W_1$, $W_2$. The RF signal electric field transitions from the horizontal to the vertical plane at the locations where the CPW RF waveguides meet the MZ electrodes.

In this example, the differential signals S+, S− are terminated differentially though two approximately 50 Ohm resistors 161, 162, and common-mode termination is provided by the VG capacitor coupled to the MZ DC bias $V_{cm}$. The MZ DC bias $V_{cm}$ is in turn capacitively coupled to RF ground which additionally ensures the smooth delivery of the differential signals S+, S− onto the microstrip MZ electrodes.

In the scheme illustrated in FIG. 3, positive MZ DC bias $V_{cm}$ is provided to both the peripheral p-type cladding and the lower n-type cladding.

Figure 4A:
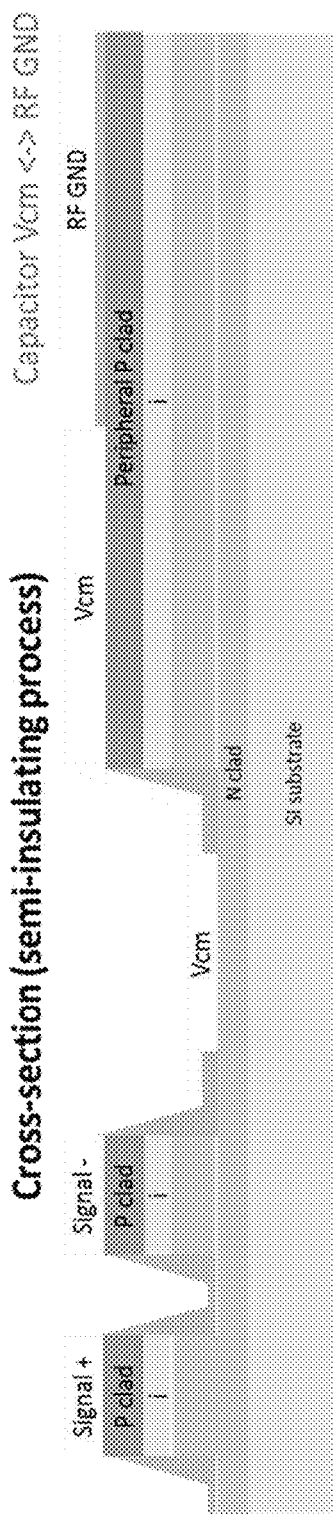
FIG. 4A is a cross sectional view through line AA' of FIG. 3.
Figure 4B:
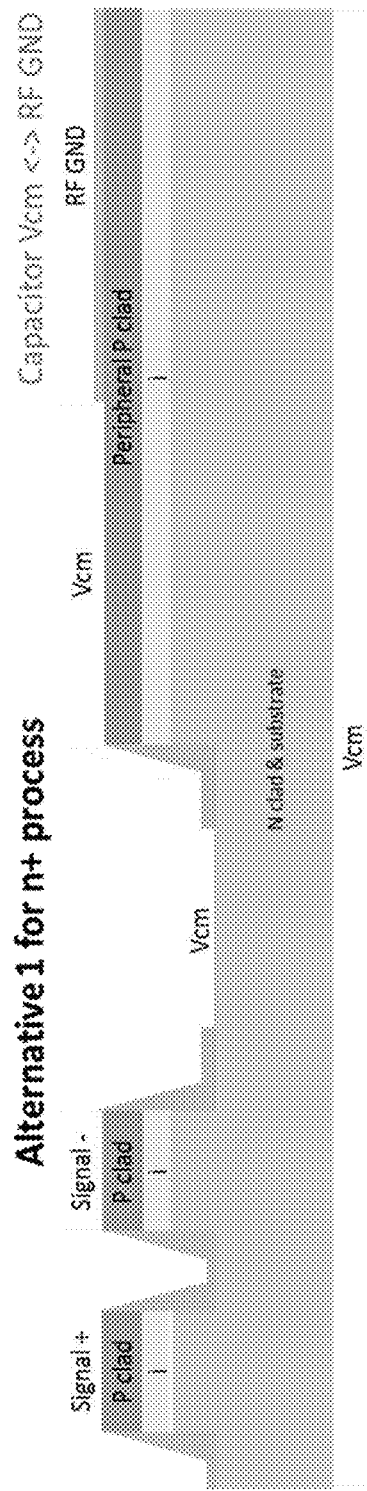
FIG. 4B is an alternative cross sectional view through line AA' of FIG. 3.
Figure 4C:
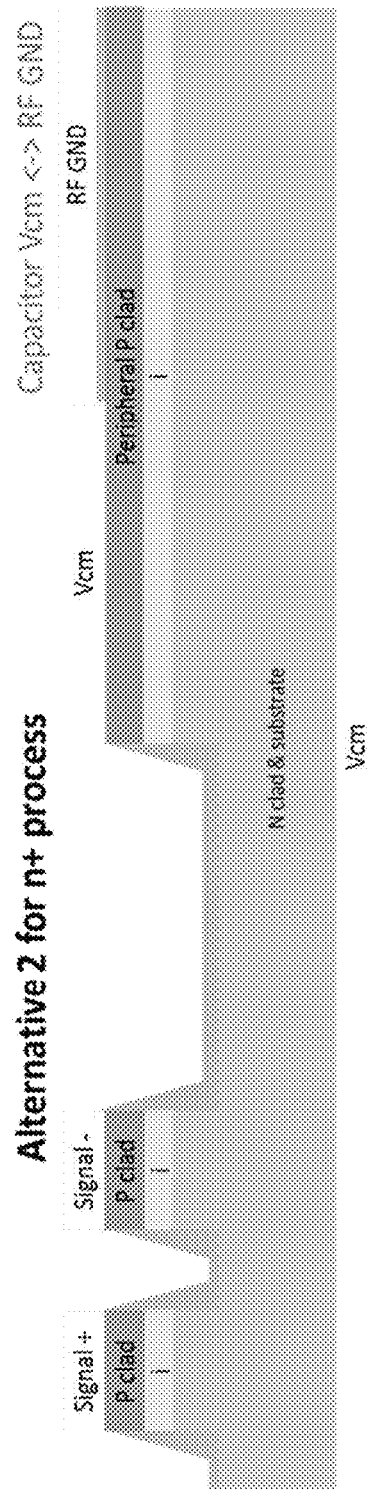
FIG. 4C is another alternative cross sectional view through line AA' of FIG. 3.

FIGS. 4A, 4B and 4C are alternative cross sectional views through line AA' in the scheme shown in FIG. 3. In all three views the MZ DC bias $V_{cm}$ contacts the peripheral p-type cladding, and the capacitor to RF ground, in the same way. The capacitor to RF ground is formed from a layer of metal and the p-type cladding, with an insulating dielectric layer in between. However, FIGS. 4A, 4B and 4C illustrate alternative ways in which the MZ DC bias $V_{cm}$ may contact the lower n-type cladding.

FIG. 4A illustrates a semi-insulating process, in which the n-type cladding contact for positive DC bias connection must be provided on a top (i.e. upper, as shown in FIG. 4A) face of the device.

FIGS. 4B and 4C illustrate alternatives for an n+process, in which the contact to the lower n-type cladding (and the substrate) is provided through a back face (i.e. lower, as shown in the Figures) contact (FIG. 4C), or both a top face and a back face contact (FIG. 4B).

Figure 5:
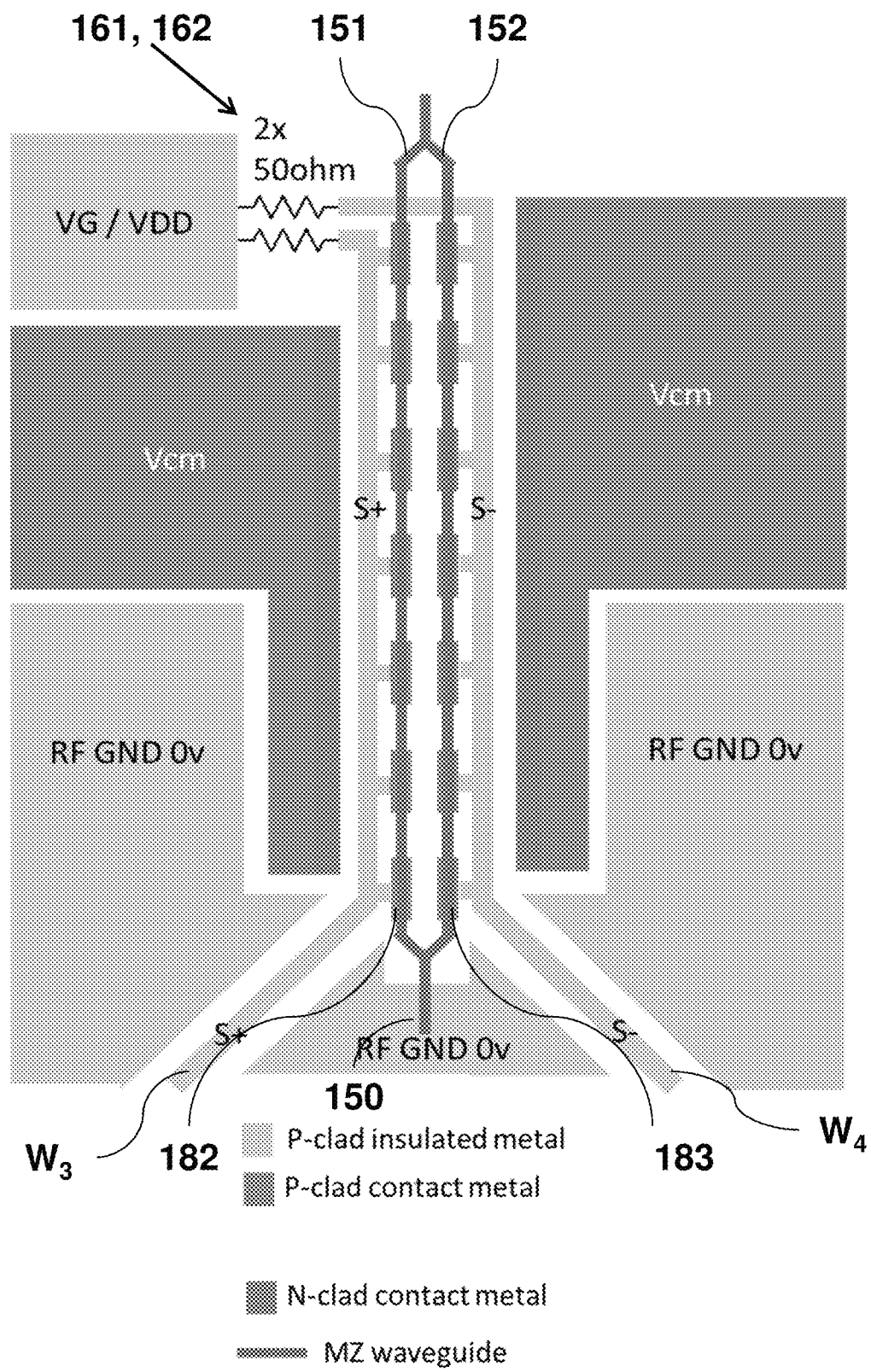
FIG. 5 illustrates a an alternative biasing and capacitive coupling scheme for use in the transmitter of FIG. 2, wherein the electrodes are of segmented type.

FIG. 5 illustrates an alternative biasing and capacitive coupling scheme for use in the optical transmitter of FIG. 2. In this illustrated example, the MZ electrodes 182,183 of the optical transmitter are of segmented, travelling wave type. Differential signals S+ and S− are delivered to the segmented MZ electrodes through GSG CPW and CPS RF waveguides $W_3$, $W_4$. The RF signal electric field transitions from the horizontal to the vertical plane at the locations where the CPS RF waveguides meet the segmented MZ electrodes.

The differential signals S+, S− are terminated differentially though two approximately 50 Ohm resistors 161, 162, and common-mode termination is provided by the VG capacitor, coupled to the MZ DC bias $V_{cm}$. The MZ DC bias $V_{cm}$ is in turn capacitively coupled to RF ground which additionally ensures the smooth delivery of the differential signals onto the segmented MZ electrodes.

In common with the scheme illustrated in FIG. 3, the scheme illustrated in FIG. 5 provides positive MZ DC bias $V_{cm}$ to both the peripheral p-type cladding and the n-type cladding.

Figure 6:
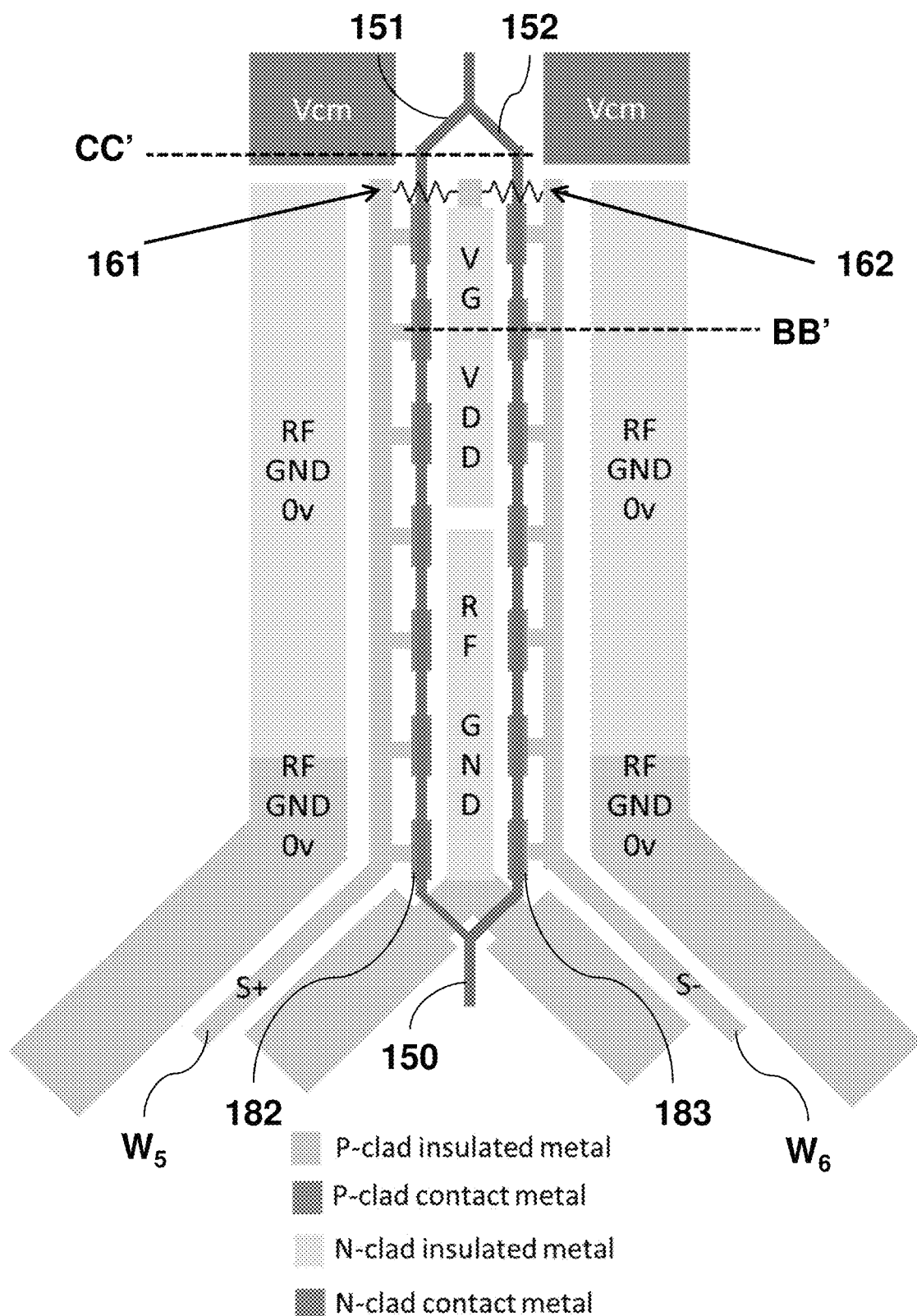
FIG. 6 illustrates an alternative biasing and capacitive coupling scheme for use in the transmitter of FIG. 2, wherein the electrodes are of segmented type.

FIG. 6 illustrates a further alternative biasing and capacitive coupling scheme for use in the optical transmitter of FIG. 2. In this further illustrated example, the MZ electrodes 182, 183 are of segmented, travelling wave type. Differential signals S+ and S− are delivered to the segmented MZ electrodes through GSG CPW and CPS RF waveguides $W_5$, $W_6$. The RF signal electric field transitions from the horizontal to the vertical plane at the locations where the CPS RF waveguides meet the segmented MZ electrodes.

The differential signals S+, S− are terminated differentially though two approximately 50 Ohm resistors 161, 162, and common-mode termination is provided by the VG capacitor, coupled to the MZ DC bias $V_{cm}$. The MZ DC bias $V_{cm}$ is in turn capacitively coupled to RF ground which additionally ensures the smooth delivery of the differential signals onto the segmented MZ electrodes.

In contrast to the first and second biasing and capacitive coupling schemes illustrated in FIGS. 3 and 5 respectively, in the alternative scheme of FIG. 6 all capacitors are provided on the lower n-type cladding layer. This removes the requirement to provide MZ DC bias $V_{cm}$ to the peripheral p-type cladding, which may be more space efficient with consideration to the total chip area.

FIGS. 7A and 7B are cross sectional views through lines BB" and CC' respectively in the scheme shown in FIG. 6. In contrast to the cross sectional views 4A, 4B and 4C described above, positive MZ DC bias $V_{cm}$ is not provided to the peripheral p-type cladding. Instead, in FIGS. 7A and 7B the required capacitive coupling is carried out entirely on a large area of exposed n-type cladding, located in a large n-well.

As discussed above (with reference to FIGS. 3, 5 and 6), alternative biasing and capacitive coupling schemes may be used with the optical transmitter of FIG. 2. In these biasing and coupling schemes, positive MZ DC bias $V_{cm}$ is provided either to the peripheral p-type cladding and the n-type cladding (FIGS. 3, 4 and 5), or to the n-type cladding only (FIGS. 6 and 7).

As discussed above with reference to FIGS. 2, 3, 5 and 6, differential termination of signals S+, S− is provided by two on-chip approximately 50 Ohm resistors in series. FIGS. 8A to 8D illustrate three alternative geometries for these on-chip 50 Ohm resistors 161, 162.

As discussed above, these three geometries are all generally optimised by keeping the resistors 161, 162 narrow and short, by using highly resistive tracks and by laying the resistors 161, 162 over an isolating stack of implanted p-cladding plus intrinsic optical waveguide core above the RF grounded n-cladding.

Figure 8:
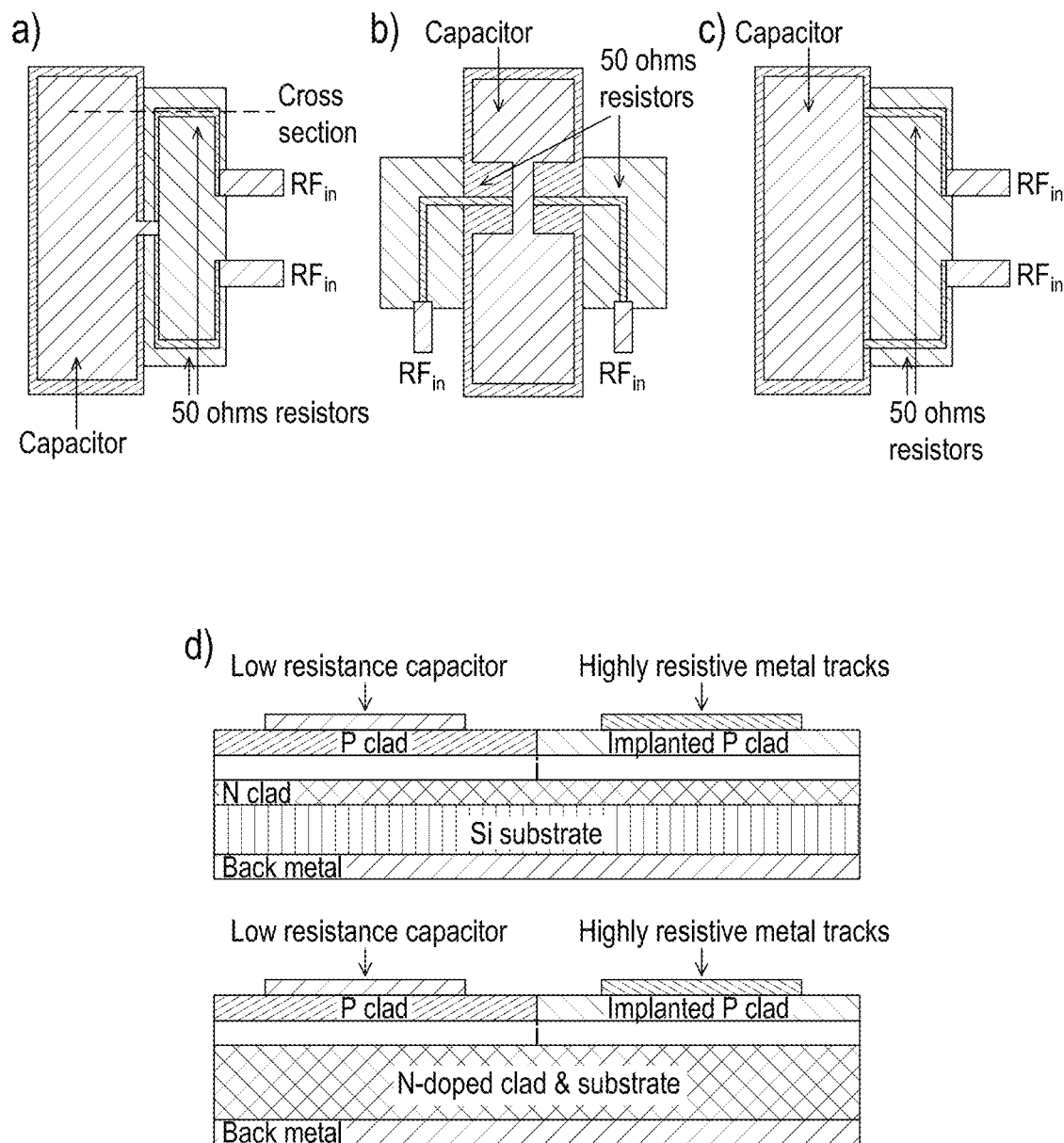
FIG. 8 illustrates in-plane (a, b, c) and vertical (d) on-chip resistor geometry.

FIG. 8 illustrates various geometries for on-chip geometries suitable for the resistors 160,161. FIGS. 8a to 8c show in-plane descriptions of possible geometries, and FIG. 8d shows two possible vertical descriptions of the geometry of FIG. 8a.

In the in-plane, on-chip resistor geometry shown in in FIG. 8a, RF differential lines are terminated using two approximately 50 Ohm metallic tracks connected to a single capacitor at virtual RF ground. In-plane geometrical choice aims to minimise the resistors' length, to reduce parasitic inductance and capacitance. Therefore, narrow and highly resistive metallic tracks are preferred. Alternative in-plane configurations are illustrated in FIGS. 8b and 8c.

FIGS. 8a and 8b naturally provide an equipotential single resistors' point contact, whereas the geometry of FIG. 8c relies on good grounding homogeneity across the capacitor, and low capacitor resistance between resistors' contact points to achieve the same performance. As discussed above, $V_{DD}$ is applied at the VG point through an inductive wire-bond connection. Since there is no RF ground connection within proximity, the VG is capacitively coupled to $V_{cm}$, which in turn is capacitively coupled to RF ground, as illustrated in FIG. 2.

FIG. 8d illustrates the vertical arrangement, in which parasitic capacitance is minimised by way of a thick, neutral implanted p-layer beneath the resistor metallic tracks. FIG. 8d illustrates both N-doped and Si substrates using the same implanted p-layer arrangement. In the case of a Si substrate, the back metal layer is optional.

Each of the resistor geometries illustrated in FIG. 8 can be utilised with the transmitter of FIG. 2 and with the biasing and coupling schemes described with reference to FIGS. 3 to 7 above.

It will be appreciated by the person skilled in the art that various modifications may be made to the above described embodiments, without departing from the scope of the present invention.

The optical transmitters described above comprise one or more MZ interferometers, each MZ interferometer comprising a pair of differentially driven MZ electrodes, a pair of resistors in series configured to provide differential RF termination of the MZ electrodes; and a capacitive coupling between a virtual ground formed at a centre point between the pair of resistors, and an RF ground configured to provide common-mode RF termination.

The inention claimed is:

1. An optical transmitter comprising:
a Mach-Zehnder (MZ) interferometer; and
a driver circuit,
the MZ interferometer and driver circuit being directly coupled, and
the MZ interferometer comprising:
a pair of differentially driven MZ electrodes configured to impart radio frequency (RF) signals to light travelling through respective arms of the MZ interferometer and receive a direct current (DC) bias as a positive voltage via lower n-type cladding of the MZ interferometer,
the lower n-type cladding being at a different positive DC potential than an upper plane RF ground of the MZ interferometer and having a similar alternating current (AC) potential to the upper plane RF ground;
a pair of resistors, connected in series, to provide differential RF termination of the pair of differentially driven MZ electrodes; and
a capacitive coupling, located between a virtual ground formed at a centre point between the pair of resistors and an RF ground, to provide common-mode RF termination,
a DC supply for the driver circuit being applied to the centre point.

2. The optical transmitter of claim 1, wherein capacitive coupling between the lower n-type cladding and the upper plane RF ground is provided by an on-chip capacitive device and an off-chip capacitive device.

3. The optical transmitter of claim 2, wherein the on-chip capacitive device has a capacitance of about 50 pf and/or the off-chip capacitive device has a capacitance of about 100 nF.

4. The optical transmitter of claim 1, wherein the common-mode RF termination is provided by a capacitive device having a capacitance of about 10 pF.

5. The optical transmitter of claim 1, wherein the DC bias is provided to both the lower n-type cladding and a peripheral p-type cladding of the MZ interferometer.

6. The optical transmitter of claim 1, wherein a lower n-type cladding contact is provided on an upper face of the MZ interferometer.

7. The optical transmitter of claim 1, wherein a lower n-type cladding contact is provided on a back face of the MZ interferometer.

8. The optical transmitter of claim 1, wherein the MZ interferometer and the driver circuit are co-located within an optical sub-assembly of the optical transmitter with no bias tee arrangement or RF component train between the MZ interferometer and the driver circuit.

9. The optical transmitter of claim 1, further comprising:
a plurality of MZ interferometers
each of the plurality of MZ interferometers comprising a modulator chip.

10. A method of biasing an optical transmitter comprising a Mach-Zehnder (MZ) interferometer and a driver circuit, the method comprising:
applying positive voltage direct current (DC) bias to a pair of differentially driven MZ electrodes of the MZ interferometer via lower n-type cladding of the MZ interferometer,
the lower n-type cladding being at a different positive DC potential than an upper plane radio frequency (RF) ground of the MZ interferometer and having a similar alternating current (AC) potential to the upper plane RF ground;
providing differential RF termination of the pair of differentially driven MZ electrodes via a pair of resistors connected in series;
providing common-mode RF termination via a capacitive coupling between a virtual ground formed at a centre point between the pair of resistors and an RF ground; and
applying a DC supply at the centre point.

11. The method of claim 10, further comprising:
providing capacitive coupling between the lower n-type cladding and the upper plane RF ground by an on-chip capacitive device and an off-chip capacitive device.

12. The method of claim 11, wherein the on-chip capacitive device has a capacitance of about 50 pf and/or the off-chip capacitive device has a capacitance of about 100 nF.

13. The method of claim 10, wherein providing the common-mode RF termination comprises:
providing the common-mode RF termination by a capacitive device having a capacitance of about 10 pF.

14. The method of claim 10, further comprising:
providing DC bias to both the lower n-type cladding and a peripheral p-type cladding of the MZ interferometer.

15. The method of claim 10, further comprising:
providing a lower n-type cladding contact on an upper face of the MZ interferometer.

16. The method of claim 10, further comprising:
providing a lower n-type cladding contact on a back face of the MZ interferometer.

17. The method of claim 10, wherein the MZ interferometer and the driver circuit are co-located within an optical sub-assembly of the optical transmitter with no bias tee arrangement or RF component train between the MZ interferometer and the driver circuit.

18. An optical transmitter comprising:
a Mach-Zehnder (MZ) interferometer; and
a driver circuit,
the MZ interferometer comprising:
a pair of differentially driven MZ electrodes configured to impart radio frequency (RF) signals to light travelling through respective arms of the MZ interferometer and receive a direct current (DC) bias as a positive voltage via lower n-type cladding of the MZ interferometer,
the lower n-type cladding being at a different positive DC potential than an upper plane RF ground of the MZ interferometer and having a similar alternating current (AC) potential to the upper plane RF ground;
a pair of resistors to provide differential RF termination of the pair of differentially driven MZ electrodes; and
a capacitive coupling, located between a virtual ground formed at a centre point between the pair of resistors and an RF ground, to provide common-mode RF termination,
a DC supply for the driver circuit being applied to the centre point.

19. The optical transmitter of claim 18, wherein capacitive coupling between the lower n-type cladding and the upper plane RF ground is provided by an on-chip capacitive device and an off-chip capacitive device.

20. The optical transmitter of claim 18, wherein the MZ interferometer and the driver circuit are co-located within an optical sub-assembly of the optical transmitter with no bias tee arrangement or RF component train between the MZ interferometer and the driver circuit.

* * * * *